United States Patent
Matsuyama

(10) Patent No.: US 7,631,431 B2
(45) Date of Patent: Dec. 15, 2009

(54) EYEGLASS FRAME MEASUREMENT APPARATUS

(75) Inventor: Yoshinori Matsuyama, Anjo (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 12/207,888

(22) Filed: Sep. 10, 2008

(65) Prior Publication Data

US 2009/0064512 A1 Mar. 12, 2009

(30) Foreign Application Priority Data

Sep. 11, 2007 (JP) .............................. 2007-236032

(51) Int. Cl.
*G01B 5/20* (2006.01)
*G01B 7/28* (2006.01)

(52) U.S. Cl. .................. 33/28; 33/200; 33/507
(58) Field of Classification Search ............ 33/28, 33/507, 200, 551, 553
See application file for complete search history.

(56) References Cited

U.S. PATENT DOCUMENTS

| | | | |
|---|---|---|---|
| 5,121,550 A * | 6/1992 | Wood et al. ............... | 33/507 |
| 5,228,242 A | 7/1993 | Matsuyama | |
| 5,515,612 A * | 5/1996 | Igarashi et al. ............ | 33/28 |
| 5,615,486 A | 4/1997 | Igarashi et al. | |
| 5,959,199 A | 9/1999 | Suzuki et al. | |
| 6,325,700 B1 | 12/2001 | Mizuno et al. | |
| 6,473,977 B1 * | 11/2002 | Kujawa ..................... | 33/28 |
| 6,742,272 B2 * | 6/2004 | Eto et al. .................. | 33/507 |
| 6,845,678 B2 * | 1/2005 | Igarashi et al. ............ | 33/28 |
| 7,467,472 B2 * | 12/2008 | Jacq ........................ | 33/28 |
| 7,500,316 B2 * | 3/2009 | Haddadi .................... | 33/28 |
| 2002/0046000 A1 | 4/2002 | Suzuki | |

FOREIGN PATENT DOCUMENTS

| | | |
|---|---|---|
| JP | 4-93163 A | 3/1992 |
| JP | 10-151553 A | 6/1998 |
| JP | 11-129149 A | 5/1999 |
| JP | 2000-314647 A | 11/2000 |
| JP | 2001-174252 A | 6/2001 |

OTHER PUBLICATIONS

Extended European Search Report dated Dec. 9, 2008.

* cited by examiner

*Primary Examiner*—Yaritza Guadalupe-McCall
(74) *Attorney, Agent, or Firm*—Sughrue Mion, PLLC

(57) ABSTRACT

An eyeglass frame measurement apparatus includes: a measurement unit which includes a tracing stylus to be inserted into a groove of a rim of an eyeglass frame, a moving mechanism for moving the tracing stylus along the groove of the rim, and a detector for detecting movement of the tracing stylus, and obtains three-dimensional shape of the rim based on a detected result by the detector; and a holding unit which includes upper and lower sliders for positioning the frame, left and right clamp pins for clamping the rim and left and right contact portion to be contacted with the rim which is clamped by the clamp pins, and holds the frame fixedly. The left and right clamp pins and the contact portions protrude from each of the upper and lower sliders. Each of the contact portions is formed at the periphery of each of the clamp pins.

6 Claims, 11 Drawing Sheets

EYEGLASS FRAME MEASUREMENT APPARATUS

BACKGROUND OF THE INVENTION

(1) Technical Field

The present invention relates to an eyeglass frame measurement apparatus for measuring the shape of a rim of an eyeglass frame.

(2) Background Art

A known eyeglass frame measurement apparatus inserts a tracing stylus into a groove of a rim of an eyeglass frame, which is held in a predetermined measurement state by a frame holding mechanism, and detects movement of the tracing stylus, thereby measuring a three-dimensional shape of the rim (target lens shape) (JP-A-2000-314647 (U.S. Pat. No. 6,325,700) and JP-A-2001-174252). As the frame holding mechanism used in the eyeglass frame measurement apparatus, various frame holding mechanisms have been suggested. Such a frame holding mechanism is proposed which has an upper slider and a lower slider that are opened/closed opposite to each other in a vertical direction (refers to a vertical direction in a state where the eyeglass frame is worn), the upper slider and the lower slider being respectively provided with a pair of openable/closable clamp pins for clamping upper and lower frames of left and right rims in a thickness direction of the rim (JP-A-4-93163 (U.S. Pat. No. 5,228,242), JP-A-10-151553, and JP-A-11-129149).

However, in the known frame holding mechanism, further improvement is demanded. As shown in FIG. 12A, the known frame holding mechanism is configured such that in a state where top ends of left and right rims of a frame F are in contact with an opposing surface 902a of an upper slider 902 and bottom ends of the left and right rims are in contact with an opposing surface 904a of a lower slider 904, the left and right rims are clamped by a pair of openable/closeable clamp pins 900 disposed on each of the upper slider 902 and the lower slide 904. The opposing surfaces 902a and 904a of the upper slider 902 and the lower slider 904 have a planar shape over a wide range so as to be in contact with the rims having various shapes. In order to clamp the rims having various shapes, the length LP of each of the clamp pins 900 (a length protruding from the opposing surface of the slider) needs to be made sufficiently long (for example, 7 mm or more).

When the tracing stylus is inserted into the groove of the rim, the hold position of each clamp pin becomes an initial position (see FIG. 12B). Accordingly, if the length LP of each clamp pin is long, when measurement is made on an eyeglass frame F2 having a rim whose vertical width is small, the tracing stylus interferes with the clamp pins, and as a result, it is impossible to narrow the measurable vertical width of the frame. In case of a measurement mechanism that inserts a tracing stylus obliquely with respect to an extension direction of the clamp pins, if the length LP of each clamp pin is long, the tracing stylus or the base of the tracing stylus interferes with the clamp pins during measurement (see FIG. 12C). This is particularly likely to occur in a measurement mechanism in which an arm having a tracing stylus attached to a front end is inclined with respect to a vertical direction (a vertical direction with respect to a measurement reference plane) in order to enable measurement of a high curved frame F4, as described in JP-A-2001-174252.

SUMMARY OF THE INVENTION

The invention has been finalized in view of the drawbacks inherent in the known eyeglass frame measurement apparatus, and an object of the invention is to provide an eyeglass frame measurement apparatus that, even if clamp pins are made short in length, is capable of stably holding an eyeglass frame, making a measurable vertical width of a frame narrow, preventing a tracing stylus from interfering with the clamp pins during measurement.

In order to solve the above-described problems, the invention has the following configuration.

(1) An eyeglass frame measurement apparatus comprising:
a measurement unit which includes a tracing stylus to be inserted into a groove of a rim of an eyeglass frame, a moving mechanism for moving the tracing stylus along the groove of the rim, and a detector for detecting movement of the tracing stylus, and obtains three-dimensional shape of the rim based on a detected result by the detector; and
a holding unit which includes upper and lower sliders for positioning the frame, left and right clamp pins for clamping the rim and left and right contact portion to be contacted with the rim which is clamped by the clamp pins, and holds the frame fixedly,
wherein the left and right clamp pins and the contact portions protrude from each of the upper and lower sliders,
wherein each of the contact portions is formed at the periphery of each of the lamp pins.

(2) The apparatus according to (1), wherein each of the contact portions is formed at an area within which each of the clamp pins is movable.

(3) The apparatus according to (1), wherein each of the contact portions has a shape in which only a part thereof close to each of the clamp pins is in contact with the rim.

(4) The apparatus according to (1), wherein each of the contact portions is formed at an outer side of each of the clamp pins.

(5) The apparatus according to (1), wherein each of the contact portions is formed at outer and inner sides of each of the clamp pins, and the outer side contact portion protrudes further than the inner side contact portion.

DESCRIPTION OF PREFERRED EMBODIMENTS

Figure 1A:
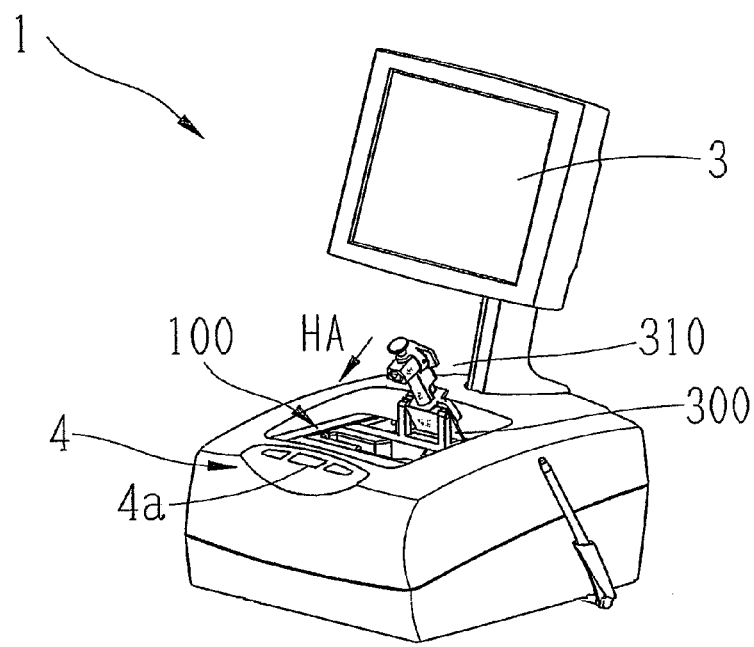
FIG. 1A is a schematic exterior view of an eyeglass frame measurement apparatus having a frame holding mechanism.

An embodiment of the invention will now be described with reference to the drawings. FIG. 1A is a schematic exterior view of an eyeglass frame measurement apparatus. An eyeglass frame measurement apparatus 1 includes a frame holding mechanism (holding unit) 100 that holds an eyeglass frame in a desired state, and a measurement mechanism 200 (see FIG. 9) that inserts a tracing stylus into a rim of the eyeglass frame held by the frame holding mechanism 100, and detects movement of the tracing stylus, thereby detecting a three-dimensional shape of the rim (target lens shape). The measurement mechanism 200 is arranged below the frame holding mechanism 100. A mounting portion 300 in which a lens holder 310 (template holder) serving as a holding jig for holding a template and a demo lens is mounted is arranged on the depth side of the apparatus (a rear side of the frame holding mechanism 100).

A switch section 4 having a measurement start switch and the like is arranged on a front side of a housing of the measurement apparatus 1. A panel section 3 having a touch panel type display is arranged on a rear side of the housing of the measurement apparatus 1. With this panel section 3, during lens processing, layout data of a lens regarding target lens shape data, processing conditions, and the like can be input. Three-dimensional data of the rim acquired by the measurement apparatus 1 and data input through the panel section 3 are transmitted to the eyeglass lens processing apparatus.

Figure 1B:
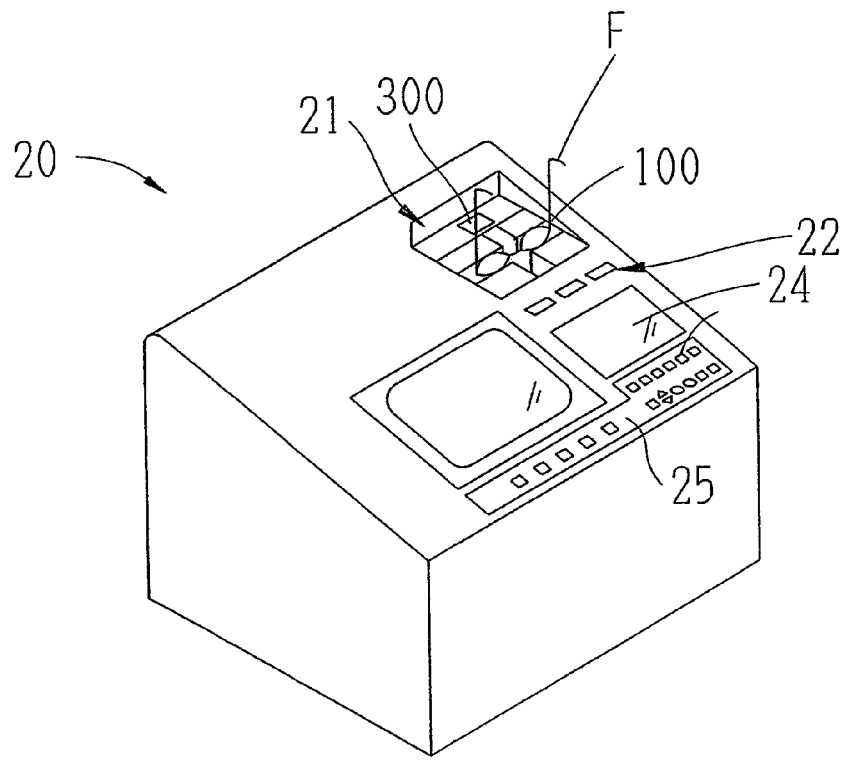
FIG. 1B is a schematic exterior view of an eyeglass lens processing apparatus having incorporated therein an eyeglass frame measurement apparatus.

As described in JP-A-2000-314617 (U.S. Pat. No. 6,325, 700), the measurement apparatus 1 may be incorporated in the eyeglass lens processing apparatus. FIG. 1B shows an example where the measurement apparatus 1 is incorporated into the eyeglass lens processing apparatus 20 as a single body. A lens processing mechanism shown in JP-A-2000-314617(U.S. Pat. No. 6,325,700) is arranged inside the eyeglass lens processing apparatus 20. A measurement apparatus 21 having the frame holding mechanism 100 and the measurement mechanism 200 is arranged on a right depth side at an upper surface of a housing of the processing apparatus 20. At the upper surface of the housing of the processing apparatus 20, a switch section 22 having a measurement start switch and the like, a display 24, on which target lens shape data or lens processing conditions are displayed, a switch 25 for inputting the processing conditions or the like are arranged on a front side of the frame holding mechanism 100.

<Frame Holding Mechanism>

Figure 2:
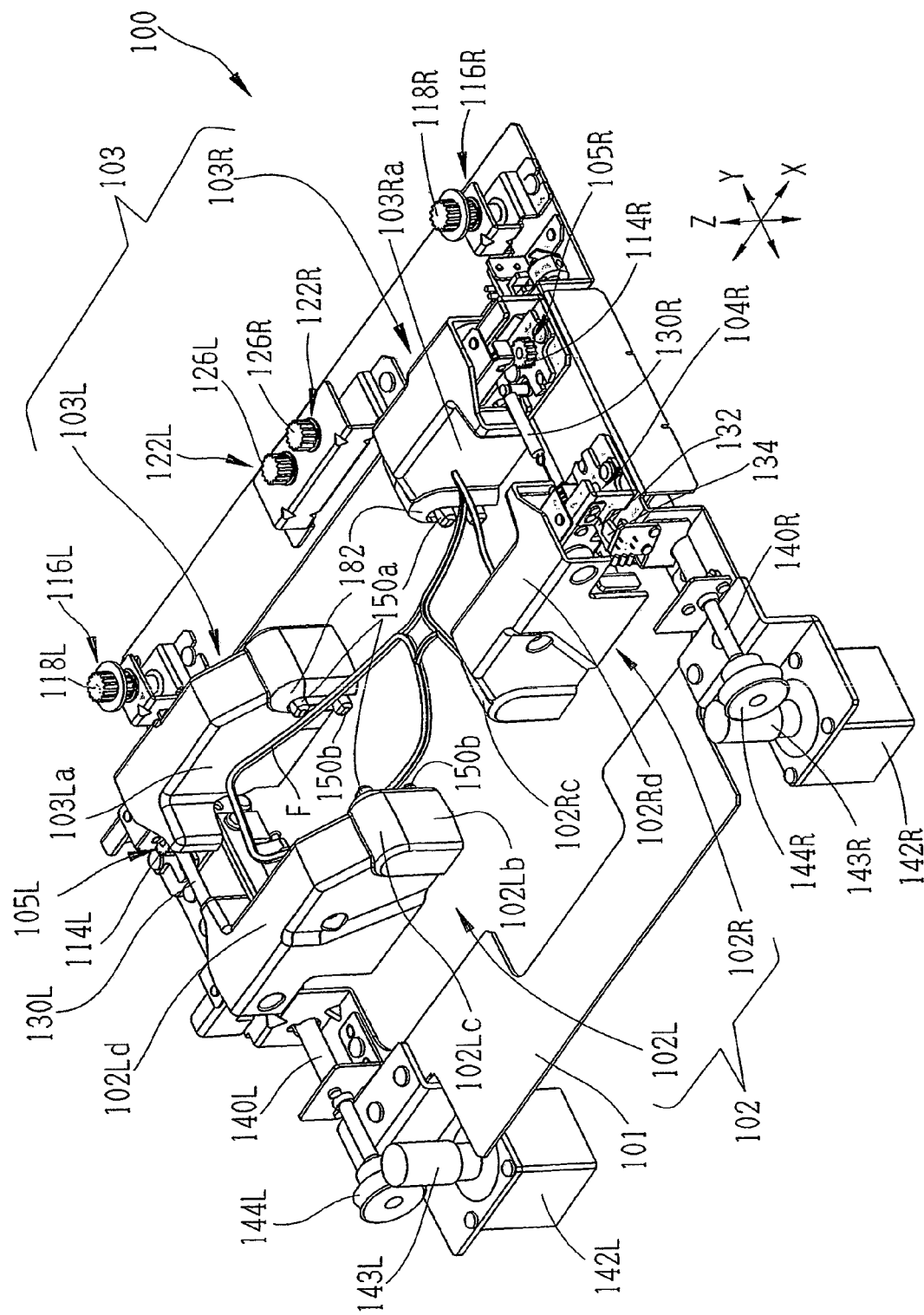
FIG. 2 is a perspective view of a frame holding mechanism.
Figure 3:
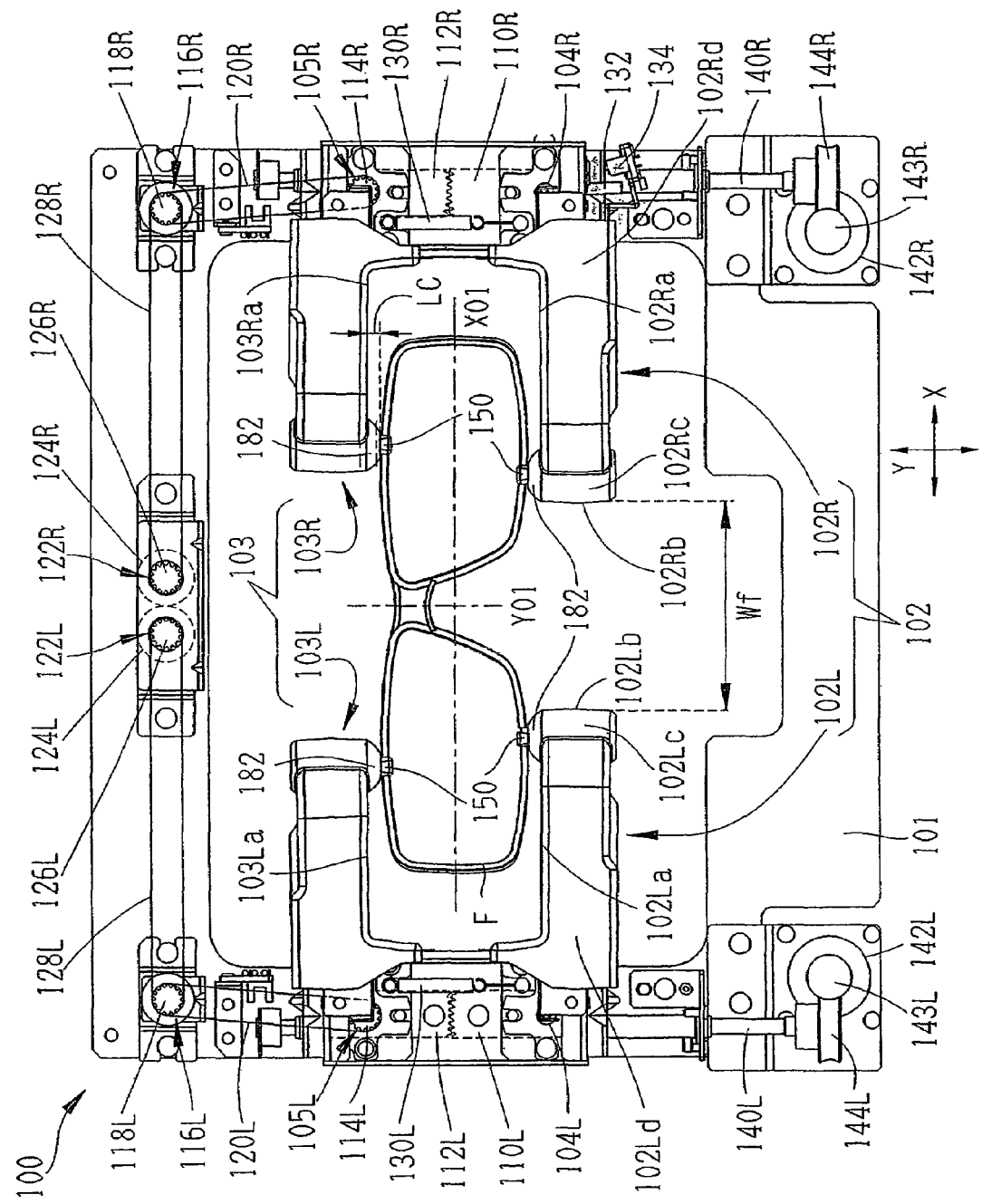
FIG. 3 is a diagram of a frame holding mechanism when viewed from the above.
Figure 4:
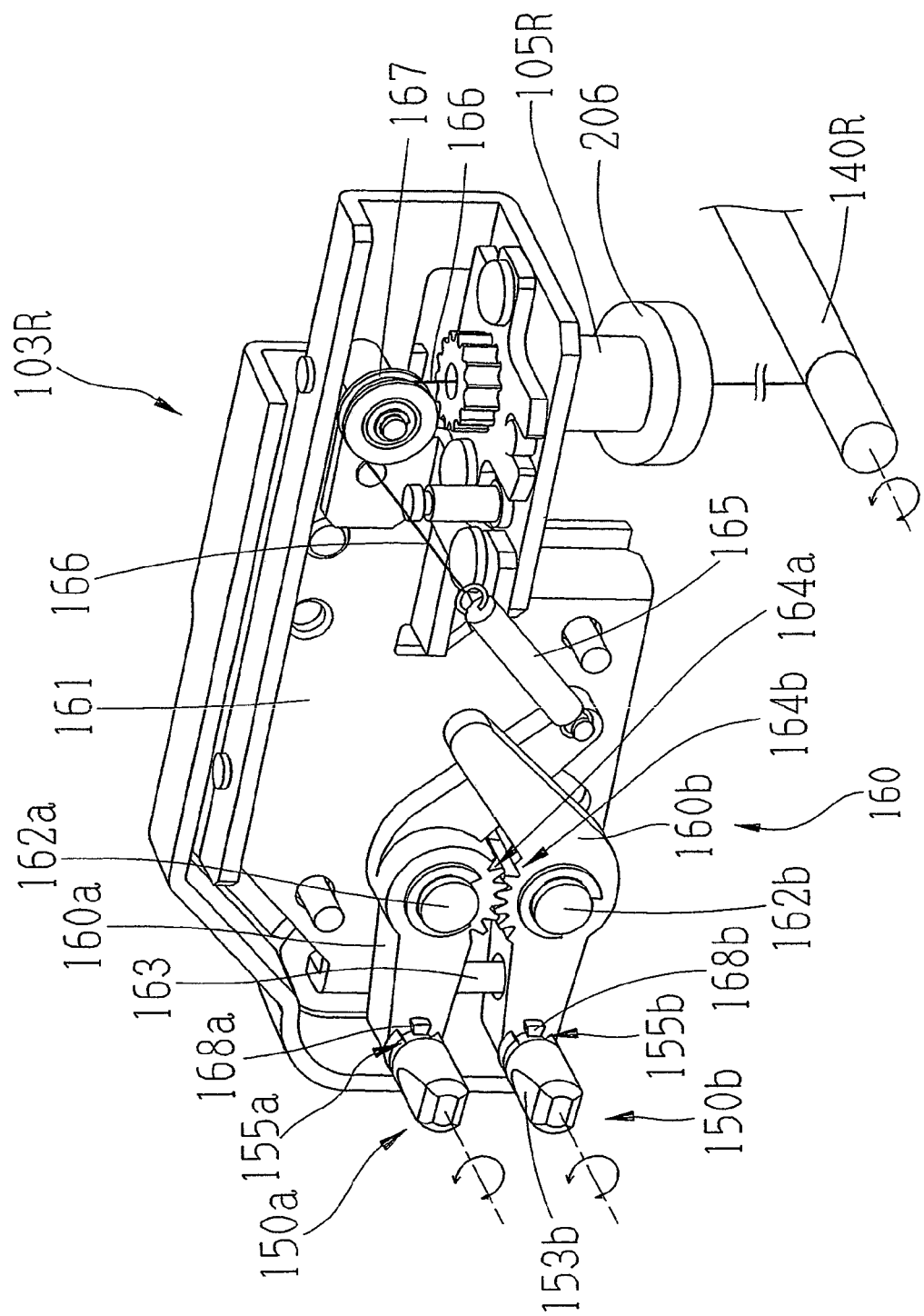
FIG. 4 is a perspective view illustrating an opening/closing mechanism of clamp pins.

The configuration of the frame holding mechanism 100 will now be described with reference to FIGS. 2 to 4. FIG. 2 is a perspective view illustrating the frame holding mechanism 100. FIG. 3 is a diagram of the frame holding mechanism 100 when viewed from the top of the apparatus. FIG. 4 is a perspective view illustrating a clamp mechanism for holding the eyeglass frame.

A pair of an upper slider 103 and a lower slider 102 are arranged on a holding portion base 101 so as to be disposed along a vertical direction of an eyeglass frame (a Y direction in FIGS. 2 and 3; refers to a vertical direction in a state where an eyeglass is worn) and to be opened/closed opposite to each other around a central reference line X01 in a horizontal direction (an X direction). The lower slider 102 is arranged on the near side of the apparatus (an operator side), and the upper slider 103 is arranged on the depth side of the apparatus (rear side). The upper slider 103 and the lower slider 102 presses the eyeglass frame in the vertical direction to position the eyeglass frame in the vertical direction. In this embodiment, the lower slider 102 has a lower right slider 102R and a lower left slider 102L. The upper slider 103 has an upper right slider 103R and an upper left slider 103L. Each slider defines the side of a central reference line Y01 in the Y direction as a front end side. A pair of openable/closable clamp pins 150 (lens rear surface-side clamp pin 150a and lens front surface-side pin 150b) are arranged on the front end side of each slider to clamp upper and lower frames of left and right rims from a Z direction (a thickness direction of the rim) perpendicular to the measurement reference plane, thereby holding the eyeglass frame F on a measurement reference plane. The lower right slider 102R, the lower left slider 102L, the upper right slider 103R, and the upper left slider 103L are held to be rotatable in a direction parallel to an XY plane around rotation shafts 104R, 104L, 105R, and 105L at the rear ends thereof, respectively. The rotations shafts 104R, 104L, 105R, and 105L are rotatably held in the holding portion base 101 by rotation shaft bearings.

A pair of lower right slider 102R and upper right slider 103R are opened/closed to be opposed to each other with respect to the reference line X01 in the horizontal direction. Similarly, a pair of lower left slider 102L and upper left slider 103L are opened/closed to be opposed to each other with respect to the reference line X01. A rotation transfer mechanism is provided such that if any one of the sliders 102R, 102L, 103R, and 103L is rotated by the operator, other sliders are interlockingly rotated. The rotation transfer mechanism has the following configuration.

A fan-shaped large gear 110R is fixed to the lower right slider 102R around the rotation shaft 104R. A fan-shaped large gear 112R is fixed to the upper right slider 103R around the rotation shaft 105R. The large gear 110R and the large gear 112R are in mesh with each other. Similarly, a fan-shaped large gear 110L is fixed to the lower left slider 102L around the rotation shaft 104L. A fan-shaped large gear 112R is fixed to the upper left slider 103L around the rotation shaft 105L. The large gear 110L and the large gear 112L are in mesh with each other.

Pulleys 114R and 114L are fixed to an upper end of the rotation shaft 105R in the upper right slider 103R and an upper end of the rotation shaft 105L of the upper left slider 103L. A pulley 118R is fixed to a rotation shaft 116R extending in the vertical direction (Z direction) on a right side at the rear of the base 101. A timing belt 120R is stretched between the pulley 114R and the pulley 118R. Simultaneously, a pulley 118L is fixed to a rotation shaft 116L extending in the vertical direction (Z direction) on a left side at the rear of the base 101. A timing belt 120L is stretched between the pulley 114L and the pulley 118L.

Gears 124R and 124L (in FIG. 3, indicated by dotted lines) are fixed to rotation shafts 122R and 122L rotatably held at a central portion of the base 101, respectively. The gear 124R and the gear 124L are in mesh with each other. Onto the gears 124R and 124L, pulleys 126R and 126L having a smaller diameter than the gears 124R and 124L are fixed. A timing belt 128R is stretched between the pulley 126R and the pulley 118R. A timing belt 128L is stretched between the pulley 126L and the pulley 118L. In FIG. 2, for simplification of explanation, the timing belts (128R and the like) and the large gears (110R and the like) are omitted.

A tension spring 130R is arranged between the lower right slider 102R and the upper right slider 103R, and similarly, a tension spring 130L is arranged between the lower left slider 102L and the upper left slider 103L. Therefore, a pair of right sliders 102R and 103R and a pair of left sliders 102L and 103L are pressed so as to be closed toward its center (reference line X01).

An upper portion of each of the rotation shafts 104R, 104L, 105R, and 105L constituting a rotation mechanism of the sliders 102R, 102L, 103R, and 103L is covered with a cover formed as a single body with each slider. An upper portion of each of the large gears 110R, 112R, 110L, and 112L is also covered with a cover.

With the rotation transfer mechanism, if the operator rotates the lower right slider 102R around the rotation shaft 104R in an open direction, the rotation is transferred to the large gear 112R by the large gear 110R, and the upper right slider 103R is rotated in the open direction. The rotation of the upper right slider 103R is transferred to the gear 124R through the members, such as the timing belt 120R, the timing belt 128R, and the like. The gear 124L which is in mesh with the gear 124R is reversely rotated with respect to the gear 124R. The rotation of the gear 124L is transferred to the rotation shaft 105L through the members, such as the timing belt 128L, the timing belt 120L, and the like, and accordingly the upper left slider 103L is rotated in the open direction around the rotation shaft 105L. The rotation of the rotation shaft 105L is transferred to the rotation shaft 104L through the large gear 112L and the large gear 110R, and accordingly the lower left slider 102L is rotated in the open direction around the rotation shaft 104L.

Figure 5:
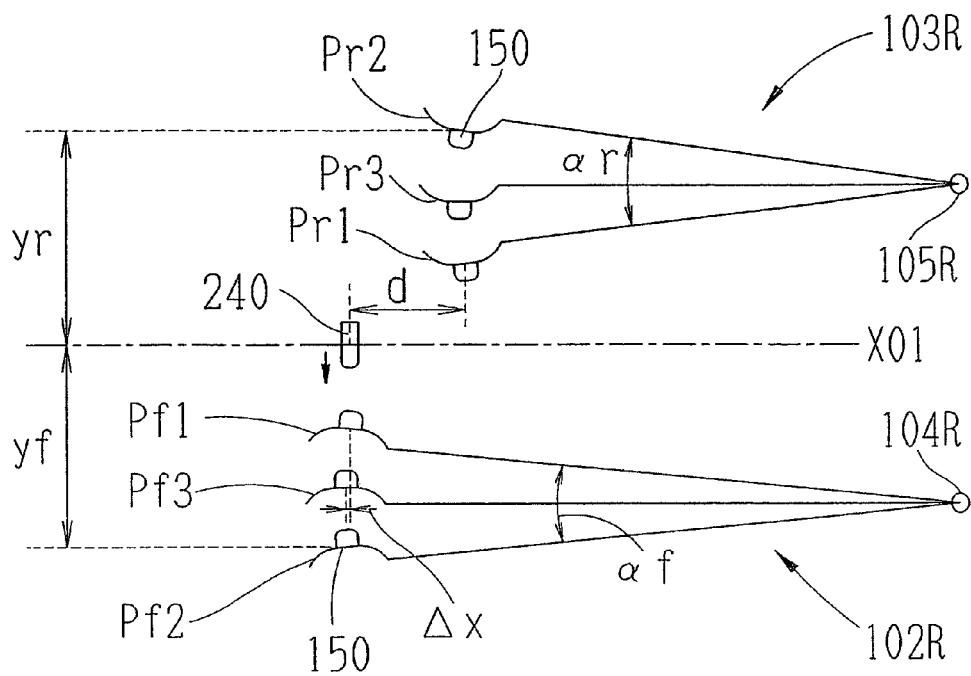
FIG. 5 is a diagram illustrating opening/closing of a lower right slider and an upper right slider.

As shown in FIG. 5, the rotation center of the lower right slider 102R (the center of the rotation shaft 104R) is substantially arranged at the center of the Y direction within an opening/closing range of the lower right slider 102R. In FIG. 5, Pf1, Pf2, and Pf3 represent the hold positions of the eyeglass frame F by the clamp pins 150 of the lower right slider 102R to be opened/closed, and Pr1, Pr2, and Pr3 represent the hold positions of the eyeglass frame F by the clamp pins 150 of the upper right slider 103R to be opened/closed. Pf1 and Pr1 represents the positions of the right sliders 102R and 103R when an eyeglass frame F having a small vertical width (refers to a vertical width in a state an eyeglass frame is worn) is held. Pf2 and Pr2 represent positions when an eyeglass frame F having a large vertical width is held. Pf3 and Pr3 represent intermediate positions between Pf1 and Pf2 and between Pr1 and Pr2 in a front-back direction, respectively. Hereinafter, a description will be provided with focus on Pf1, Pf2, Pf3. The rotation center of the lower right slider 102R is disposed on a line which passes through the position Pf3 and is in parallel with the reference line X01 in the horizontal direction. The position of the rim held by the clamp pins 150 of the lower right slider 102R is an initial position where a tracing stylus 240 is inserted into a groove of the rim when measurement starts. For example, when measurement starts, the tracing stylus 240 is inserted into the groove of the rim based on the position Pf3. Since the lower right slider 102R is rotated around the rotation shaft 104R, the hold positions (Pf1, Pf2, and Pf3) by the clamp pins 150 are slightly deflected in the horizontal direction, but with the arrangement around the rotation shaft 104R, a deflection Δx can become as small as possible, and the tracing stylus 240 can be prevented from being out of the groove of the rim when being inserted.

The rotation center of the lower left slider 102L (the center of the rotation shaft 104L) is also substantially arranged at the center of the front-back direction within the opening/closing range of the lower left slider 102L. The rotation centers of the upper right slider 103R and the upper left slider 103L have the same arrangement.

The clamp pins 150 in the lower right slider 102R and the clamp pins 150 in the upper right slider 103R are different in the position of the horizontal direction. In FIG. 5, the clamp pins 150 in the upper right slider 103R are arranged to lean to the rotation shaft 105R. If the clamp pins 150 of the lower right slider 102R and the upper right slider 103R are aligned with each other, when an eyeglass frame F having a small vertical width (for example, a frame having a rim whose vertical width is 18 mm) is held, the gap is significantly narrowed. In this case, when a reference position shown in FIG. 5 is set in order to insert the tracing stylus 240 into the groove of the rim held by the clamp pins 150 in the lower right slider 102L, the tracing stylus 240 interferes with the clamp pins 150 in the upper right slider 103R. In order to avoid this interference, the clamp pins 150 in the upper right slider 103R are arranged rightward by a distance d.

With the arrangement of the clamp pins 150, if the lower right slider 102R and the upper right slider 103R are configured to be rotated around the rotation shafts 104R and 105R so as to be opened at the same angle, respectively, the distances yf and yr of the clamp pins 150 with respect to the reference line X01 become different from each other. If the distances yf and yr are significantly different from each other, the central position of the rim in the front-back direction also varies, and accordingly an error is likely to occur when measurement of the template.

Therefore, even if the lower right slider 102R and the upper right slider 103R are interlockingly rotated, a rotation transfer mechanism between the lower right slider 102R and the upper right slider 103R is configured such that the lower right slider 102R and the upper right slider 103R are operated while the distances yf and yr are substantially the same (symmetric). To this end, the gear ratio of the large gears 110R and 112R is changed. That is, the rotation angle αf of the lower right slider 102R and the rotation angle αr of the upper right slider 103R are calculated in accordance with distances from the rotation centers to the clamp pins 150 such that the distances yf and yr are always constant. And, the gear ratio of the large gears 110R and 112R serving as a rotation angle adjustment and transfer member. In this apparatus, the large gears 110R and 112R are formed such that the gear ratio thereof becomes 51:45.5. The rotation angle adjustment and transfer member may be configured to open/close the upper and lower sliders such that the clamp pins of the upper and lower sliders are substantially arranged at the same distance with reference to the reference line X01. Alternatively, the rotation angle adjustment and transfer member may use a pulley, a wire, a belt, or a crank mechanism.

In FIG. 3, a light-blocking plate 132 is fixed to the right side of the lower right slider 102R. A photosensor 134 is fixed to the holding portion base 101. If the lower right slider 102R is rotated to a movement limit position in the open direction, the light-blocking plate 132 is detected by the photosensor 134. Therefore, a control unit detects that each of the sliders 102R, 102L, 103R, and 103L is in an opened state. If measurement of a template or demo lens starts with the lower right slider 102R opened, the open state of each slider is fixed by a lock mechanism (not shown).

As described above, if the four sliders 102R, 102L, 103R, and 103L are configured to be opened/closed by the rotation mechanism, as compared with the direct-acting mechanism in the related art, with simple configuration, each slider can be covered with a cover occupying a small space, and dust rarely enter into the holding mechanism. Therefore, in case of prolonged use, opening and closing movements are smoothly conducted, and the eyeglass frame F is stably held. In addition, with simple configuration, it is possible to make the mechanism be rarely caught by the operator, as compared with the direct-acting mechanism.

Next, an opening/closing mechanism 160 of the clamp pins 150 at the front end of each of the sliders 102R, 102L, 103R, and 103L will be described with reference to FIG. 4. FIG. 4 is a diagram showing the schematic configuration of the opening/closing mechanism 160 arranged in the upper right slider 103R.

As shown in FIG. 2, the clamp pins 150 have a rear surface-side first clamp pin 150a and a front surface-side second clamp pin 105b for clamping the rim of the eyeglass frame F in a horizontal state from the thickness direction (the Z direction perpendicular to the measurement reference plane). The first clamp pin 150a is rotatably held at the front end of a pin holder 160a having a V shape (letter "V" shape). A base plate 161 is arranged inside the upper right slider 103R, and the central portion of the pin holder 160a is rotatably held by a rotation shaft 162a with respect to the base plate 161. The second clamp pin 150b is rotatably held at the front end of a pin holder 160b. The central portion of the pin holder 160b is rotatably held by a rotation shaft 162b with respect to the base plate 161. A compressed spring 163 is attached to the pin holders 160a and 160b around the clamp pins 150, and the gap between the two clamp pins 150a and 150b are constantly pressed in the open direction. A gear 164a which is concentric with the rotation shaft 162a is formed at the central portion of the pin holder 160a. Similarly, a gear 164b which is concentric with the rotation shaft 162b is formed at the central portion of the pin holder 160b. The gear 164b is in mesh with the gear 164a.

A wire 166 having a spring 165 attached thereto is fixed to the rear end of the pin holder 160a. The wire 166 passes through a hollow portion in the rotation shaft 105R through a pulley 167 rotatably attached to the base plate 161, and is then fixed to a shaft 140R (see FIG. 3). If the shaft 140R is rotated, the wire 166 is wound around the shaft 140R and stretched, and the pin holder 160a is rotated in a counterclockwise direction around the rotation shaft 162a. At this time, the gear 164a is in mesh with the gear 164b, and the pin holder 160b is rotated in a clockwise direction around the rotation shaft 162b. Therefore, the two clamp pins 150a and 150b are interlockingly closed (the gap is narrowed), and the rim is clamped by the two clamp pins 150a and 150b. Although the wire 166 is wound by a predetermined amount in accordance with the rotation of the shaft 140R, since the spring 165 is expanded, a clamping force when a rim having a predetermined thickness is held between the clamp pins 150a and 150b substantially becomes constant so as not to be excessive. Therefore, deformation is suppressed.

The shaft 140R is rotated by a clamping motor 142R shown in FIG. 3. In FIG. 3, the motor 142R is attached to the rear side of the holding portion base 101. A worm gear 143R is attached to the rotation shaft of the motor 142R, and is in mesh with a gear 144R at an end of the shaft 140R rotatably attached to the holding portion base 101. Thus, the rotation of the motor 142R is converted into the rotation of the shaft 140R.

The opening/closing mechanism 160 of the clamping pins 150 at the front end of each of other sliders 102R, 102L, and 103L basically has the same configuration as shown in FIG. 4. A wire for closing the two clamp pins 150 in the lower right slider 102R is wound around the shaft 140R, similarly to the upper right slider 103R. In FIG. 3, on a left side of the holding portion base 101, a shaft 140L is rotatably held to wind a wire for closing the clamp pins 150 of each of the slider 102L and 103L therearound. Then, the shaft 140L is rotated by a rotation mechanism formed by a motor 142L, a worm gear 143L, and a gear 144L of the same type as the shaft 140R on the right side. The motors 142R and 142L are rotated synchronously in response to a signal from a tracing switch 4a in the switch section 4 of FIG. 1A, and the clamp pins 150 in each of the sliders 102R, 102L, 103R, and 103L are closed simultaneously.

The center of the two clamp pins 150a and 150b has the same height over the entire configuration of the clamp pins 150a and 150b of the four sliders 102R, 102L, 103R, and 103L, and the clamp pins 150 of each of the sliders 102R, 102L, 103R, and 103L are closed simultaneously. Thus, the eyeglass frame F is held on a reference plane S01 (see FIGS. 6A to 6D).

Figure 6A:
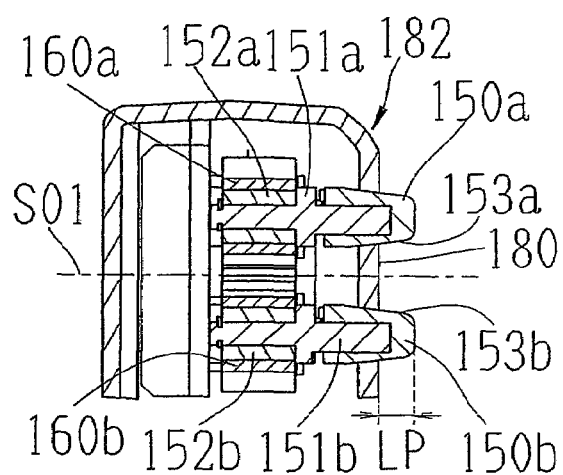
FIG. 6A is a vertical sectional view of clamp pins.
Figure 6B:
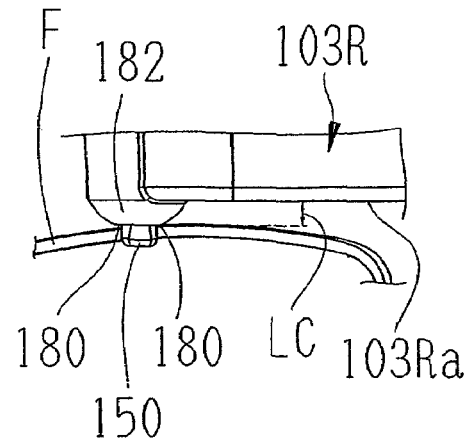
FIG. 6B is an enlarged top view of the periphery of clamp pins disposed on an upper right slider.
Figure 6C:
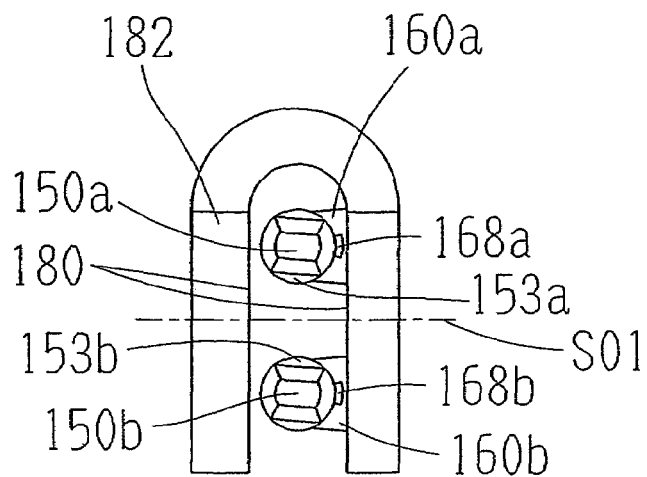
FIGS. 6C and 6D are diagrams of clamp pins and the periphery thereof when viewed from the front.
Figure 6D:
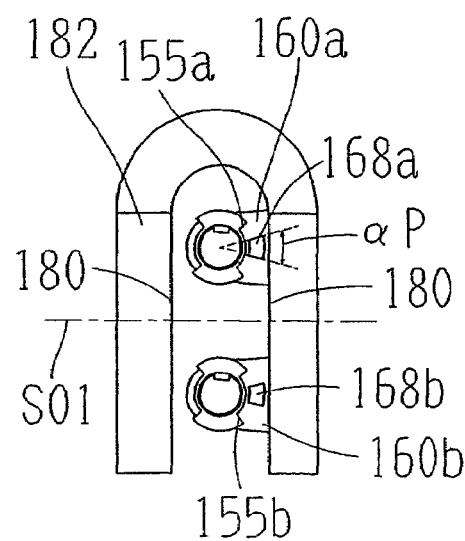

The configuration of the clamp pins 150a and 150b, and the characteristic configuration when the rim is clamped will be described with reference to FIGS. 4 and 6A to 6D. FIG. 6A is a vertical sectional view centering on the clamp pins 150. FIG. 6B is an enlarged top view of the periphery of the clamp pins 150 in the upper right slider 103R. FIGS. 6C and 6D are diagrams of the clamp pins 150 in the upper right slider 103R when viewed from the front. FIG. 6D is a front view when the clamp pins 150a and 150b are removed.

A rotation shaft 151a is fixed to an inner center of the clamp pin 150a in contact with the lens rear surface. The rotation shaft 151a is rotatably held by the pin holder 160a through a rotation shaft bearing 152a. A rotation shaft 151b is fixed to an inner center of the clamp pin 150b in contact with the lens front surface. The rotation shaft 151b is rotatably held by the pin holder 160b through a rotation shaft bearing 152b. A base portion of the clamp pin 150a has a cylindrical shape, and a planar portion 153a is formed on a side on which the front end of the clamp pin 150a is in contact with the rim (the lens rear surface). Similarly, a planar portion 153b is formed on a side on which the front end of the clamp pin 150b is in contact with the rim (the lens front surface). The rim of the eyeglass frame is clamped by the planar portion 153a of the clamp pin 150a and the planar portion 153b of the clamp pin 150b. Planar portions are also formed on an opposite to the planar portion 153a in the clamp pin 150a and an opposite side of the planar portion 153b in the clamp pin 150b. These opposite side planar portions are formed to allow the clamp pins 150a and the 150b to have the same structure, and they may not be provided.

The clamp pins 150a and 150b are individually provided with a mechanism for controlling rotation (rotation control mechanism). In FIGS. 4 and 6B, a cutout 155a is formed in a flange portion of the rotation shaft fixed inside the clamp pin 150a. A protrusion 168a is formed in the pin holder 160a to be in contact with the cutout 155a. If the protrusion 168a is in contact with the cutout 155a, the rotation of the clamp pin 150a is regulated within a range of a predetermined angle $\pm\alpha P$ (for example, ±30 degrees) with respect to when the planar portion 153a is in the horizontal state. The clamp pin 150b also has a cutout 155b formed in a peripheral portion of its base portion. If a protrusion 168b formed in the pin holder 160a is in contact with the cutout 155b, the rotation of the clamp pin 150a is regulated within a range of ±αP with respect to when the planar portion 153b is in the horizontal state.

With the clamp pins 150, when a rim having small strength, such as a cell frame, is held by the clamp pins 150, it is possible to prevent the rim from being deformed. In addition, when a rim having a small width in the lens surface direction is measured, it is possible to prevent the rim from being moved sideways. Hereinafter, the operations will be described with reference to FIGS. 7 and 8.

Figure 7A:
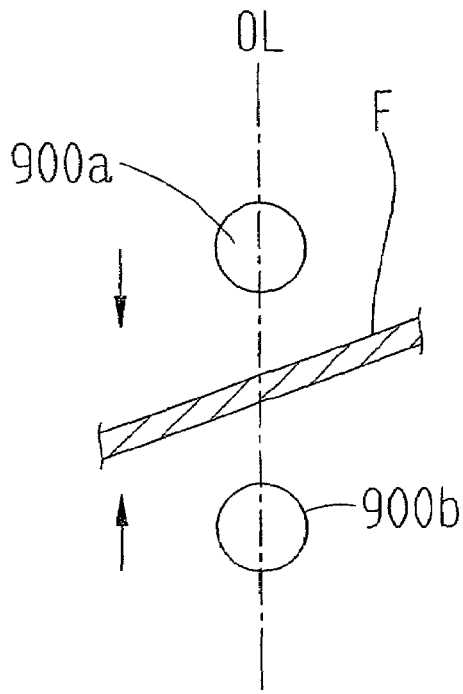
FIGS. 7A and 7B are diagrams illustrating clamping of an eyeglass frame by known clamp pins.
Figure 7B:
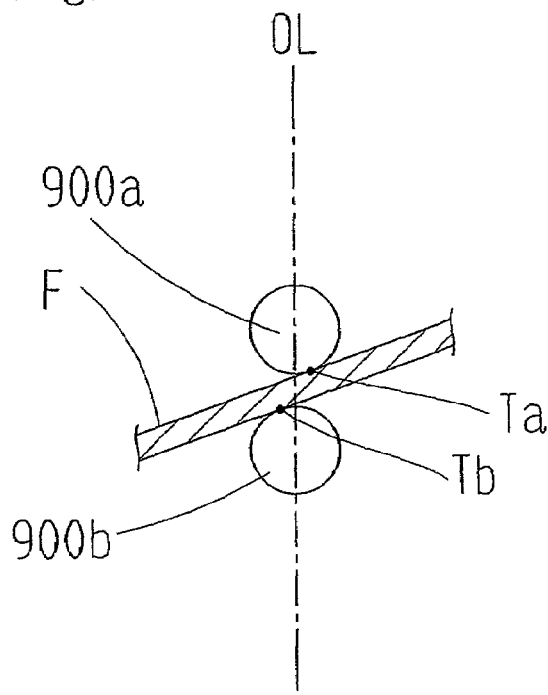
Figure 8A:
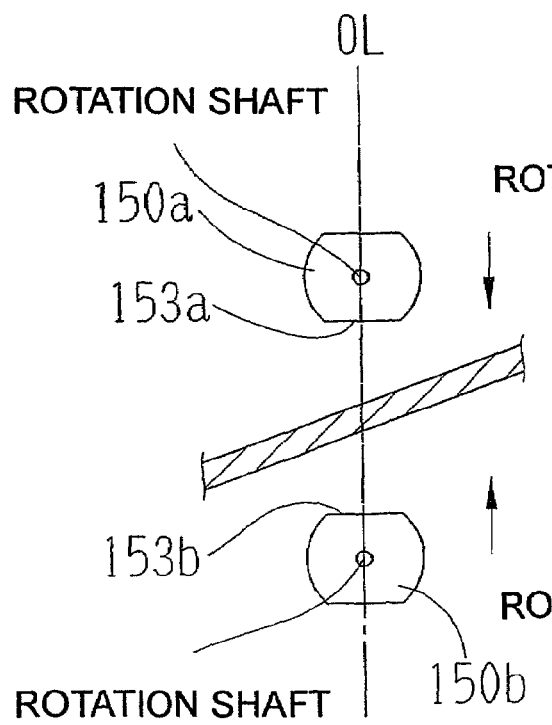
FIGS. 8A and 8B are diagrams illustrating clamping of an eyeglass frame by clamp pins according to an embodiment of the invention.
Figure 8B:
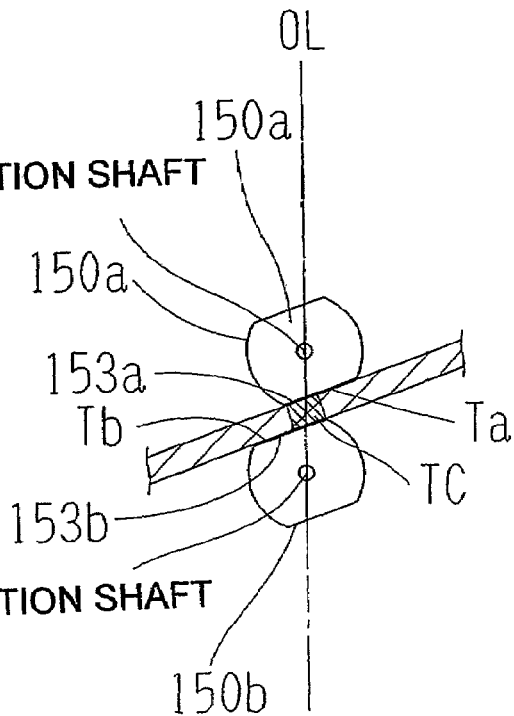

Here, clamping of the rim will be described in connection with a high curved rim (a frame having a large warp angle (slope) to be of a curve value 8). FIGS. 7A and 7B are diagrams illustrating holding of an eyeglass frame F (rim) by known clamp pins 900a and 900b. FIGS. 8a and 8B are diagrams illustrating holding an eyeglass frame F by the clamp pins 150a and 150b of this apparatus. FIGS. 7A and 8A show a state where the clamp pins are opened, and FIGS. 7B and 8B show a state where the clamp pins are closed and the rim of the frame F is clamped. In the drawings, a one-dot-chain line OL represents a center line connecting the centers of the two clamp pins.

In the related art, the section of the clamp pin 900a in contact with the lens rear surface and the section of the clamp pin 900b in contact with the lens front surface have a circular shape. For this reason, when a rim of a frame F having a slope is clamped by the two clamp pins 900a and 900b, as shown in FIG. 7B, the contact portions Ta and Tb by the clamp pins 900a and 900b substantially become points, and the contact portions Ta and Tb have a linear shape (in the drawing, point-like). For this reason, a frictional force between the rim and the clamp pins 900a and 900b only occurs in the contact portions Ta and Tb having a linear shape, and accordingly the rim may be moved sideways due to pressure when the tracing stylus 240 is inserted into the groove of the rim. To suppress this phenomenon, if a clamping force of the clamp pins is increased, the rim may be deformed, and measurement accuracy may be deteriorated.

The contact portions Ta and Tb are shifted in opposing directions from the center line OL, and the shift of the contact portions Ta and Tb is increased as the frame F has larger curve (warp angle). In this case, a clamping force is applied to the rim in different directions at the contact portions Ta and Tb, and accordingly, the rim of the frame F is liable to be deformed. If the rim is deformed, the target lens shape is changed, and it is difficult to obtain a measurement result with high accuracy. To suppress this phenomenon, if the clamping force of the clamp pins is reduced, the rim is insufficiently fixed, and measurement accuracy is likely to be deteriorated.

In contrast, it is possible to resolve the problems in the related art by using the clamp pins 150a and 150b shown in FIGS. 6A to 6D. If the clamp pin 150a is moved in the hold direction of the frame F (downward in FIGS. 8A and 8B), an end of the planar portion 153a is in contact with the rim, and the clamp pin 150a is rotated such that the planar portion 153a follows the slope of the frame F. Similarly, if the clamp pin 150b is moved in the hold direction of the frame F (upward in FIGS. 8A and 8B), an end of the planar portion 153b is in contact with the frame F, and the clamp pin 150b is rotated such that the planar portion 153b follows the slope of the frame F. If the planar portions 153a and 153b are in contact with the frame F along the slope of the frame F, the contact portions Ta and Tb are both in surface or linear contact with the frame F. For this reason, as compared with the contact portions Ta and Tb of FIG. 7B in the known apparatus which are substantially in point contact with the frame, in this apparatus, as shown in FIG. 8B, the contact portions Ta and Tb are both in surface or linear contact with the frame. Thus, a frictional force at the contact portions Ta and Tb is improved. In addition, a clamping force is distributed, and thus a force applied to bend the rim of the frame F is distributed. Furthermore, the contact portions Ta and Tb are in surface or linear contact with the frame, and a portion TC where the force overlaps exists. As a result, a biasing at a portion to which the force is applied is reduced.

With the clamp pins having this configuration, in a frame to be illustrated below, the following effects are obtained. The contact portions Ta and Tb are increased in area, and the frictional force is increased. Thus, when a metal frame having a small width in a lens surface direction of the rim is measured, side slip is suppressed. In addition, the clamping force is distributed, and thus when a rim having small strength, such as a cell frame, is clamped, deformation of the rim is suppressed. Furthermore, since the portion TC where the force overlaps when clamping exists, biasing at a portion to which the force is applied reduced, and deformation of a rim having a large warp angle (slope), such as a high curved frame, is suppressed. Furthermore, the clamping force is distributed, and the frictional force of the contact portions Ta and Tb is improved. Therefore, even if the clamping force of the clamp pins 150 becomes small, the above-described clamping can be performed. As a result, the clamping motors 142R and 142L can be reduced in power, and the apparatus main body can be reduced in size.

The rotation limit mechanism of the clamp pins 150a and 150b is provided to prevent the rim of the frame F from being clamped at circular portions out of the planar portions 153a and 153b.

The clamp pins 150a and 150b are formed of elastic rubber, and are slightly deformed when a force is applied. For this reason, the planar portions 153a and 153b in contact with the rim of the frame F may substantially have a planar shape, such as a curved surface having a large curvature radius. Further, the planar portions 153a and 153b may have a shape having a large contact area with the rim of the frame F.

Next, a holding mechanism for holding various frames F on the measurement reference plane S01 while the length LP of each of the clamp pins 150a and 150b is not long will be described. In FIGS. 3 and 6B, at the periphery on the left and right sides of the clamp pins 150a and 150b at the front end of the slider 103R, contact portions 180 are provided to be in contact with the edge of the frame F (rim), and a protrusion cover 182 is provided to protrude from the periphery on the left and right sides toward the rim. The protrusion cover 182 has a symmetric arc shape in which the base is widened from the contact portions 180 when viewed from the Z direction (the vertical direction of the apparatus).

The contact portions 180 of the protrusion cover 182 are not limited to the shape shown in FIGS. 3 and 6B, but a contact portion may be formed on at least one of the left and right sides to be close to the clamp pins 150a and 150b within a movable range in which the planar portion 153a of the clamp pin 150a and the planar portion 153b of the clamp pin 150b are opened/closed (the details will be described below). In case that the clamp pins 150a and 150b are not rotated, a contact portion 180 may be arranged other than the left and right sides of the clamp pins 150a and 150b. For example, a vertical slit (a slit extending in the Z direction) may be formed at the centers of each of the clamp pins 150a and 150b, and a contact portion 180 extending in vertical direction may be arranged between the vertical slits.

Figure 14:
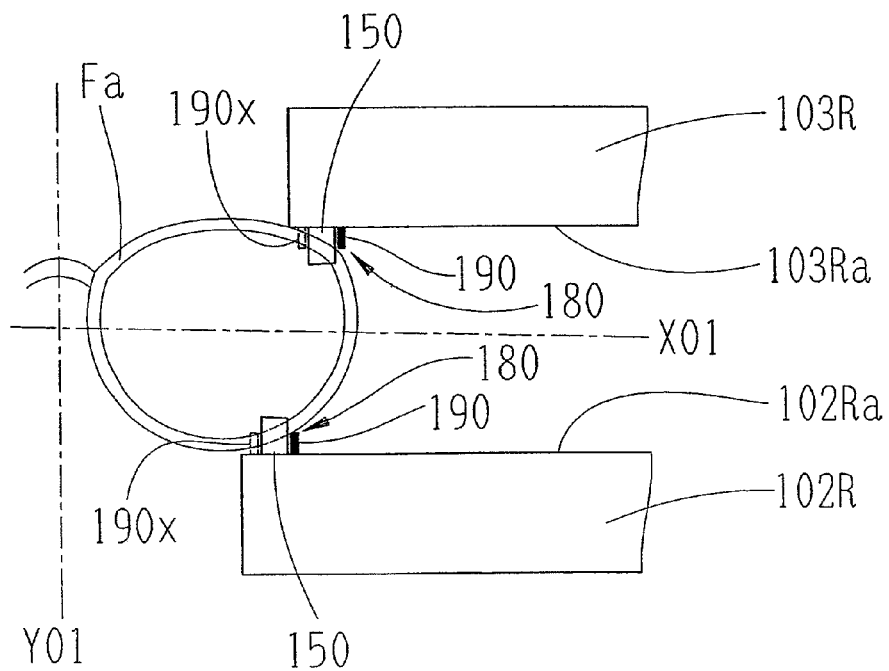
FIG. 14 is a diagram illustrating a modification of a contact portion of a slider.

When a contact portion 180 is formed on one of the left and right sides of the clamp pins 150, as shown in FIG. 14, it is preferably formed at a position close to the clamp pins 150 on a side on which an ear side of each of the left and right rims clamped by the clamp pins 150 is disposed. FIG. 14 only shows a state where the right rim is clamped by the clamp pins 150 of the right sliders 102R and 103R, and the left rim is omitted. In the example of FIG. 14, the contact portions 180 are formed in front of plate members 190 which are fixed to protrude from the opposing surfaces of the sliders 102R and 103R. The contact portion 180 of each of the plate member 190 is formed to have a height (refers to a width in the clamping direction) larger than the opening range of the clamp pins 150a and 150b.

In FIG. 14, positions where members having the same shape as the plate members 190 are arranged on a nose side close to the clamp pin 150 are indicated by dotted lines 190x. In the drawing, a rim Fa of an eyeglass frame for children having a small horizontal width is in contact with the contact portions 180 of the plate members 190 in the sliders 102R and 103R, and is clamped by the clamp pins 150.

If it is assumed that contact portions are provided at the positions indicated by the dotted lines 190x, the rim Fa is in contact with the contact portions on the nose side. For this reason, the frame is clamped by the front ends of the clamp pins 150, and accordingly clamping stability is lacking. In particular, in case of a frame, such as the rim Fa, which is clamped at the vicinity of the ear side, the clamping position is approximated to the ear side having large curvature, clamping may be impossible. In contrast, if a contact portion 180 is only provided on a side on which the ear side of each rim is disposed, even a frame, such as the rim Fa shown in FIG. 14, in which the ear side becomes the clamping position, clamping can be performed. In addition, since the contact portions 180 are provided, even a frame having a rim whose vertical width on the ear side is large can be clamped. The contact portions provided on the left and right sides of the clamp pins may be formed such that the ear side of a person who wears the eyeglass protrudes from the nose side.

In the upper right slider 103R shown in FIGS. 3 and 6C, a cover surface 103Ra which is disposed at the rear of the contact portions 180 of the protrusion cover 182 and is opposed to the frame F is formed to be spaced by a distance LC such that the rim is not in contact therewith, if possible. The distance LC is designed to be a distance such that even a frame of a type in which the vertical width of the rim of the frame F is widened on the ear side, the rim is prevented from being in contact with the cover surface 103Ra, if possible, when the frame is clamped by the clamp pins 150. The distance LC is made longer than at least the length LP of each clamp pin 150 (the length protruding from each contact portion 180 toward the rim). The distance of the cover surface 103Ra may be set so as to be gradually increased from the root of the protrusion cover 182. In this embodiment, design is made such that the distance LC of 7 mm or more is ensured.

As for other sliders 102R, 102L, and 103L, a protrusion cover 182 having contact portions 180 near the clamp pins 150 is formed. Each of cover surfaces 102Ra, 102La, and 103La opposed to the frame F is formed such that the distance LC is ensured so as for the rim of the frame F to be not in contact therewith.

The length LP (see FIG. 6A) from the contact portion 180 to the clamp pin 150a (150b) is preferably as short as possible, and in this apparatus, the length LP is set to approximately 3 mm. If the rim of the frame F is in contact with the contact portion 180, even though the length LP of the clamp pin 150a (150b) is set to 3 mm, it is possible to stably hold the frame F on the measurement reference plane S01. The reduction of the length LP as compared with the related art ensures reduction of the length of an inserted portion of the tracing stylus 240. Therefore, the measurable vertical width of the frame F can be reduced, while interference between the tracing stylus 240 and the clamp pins 150 can be avoided.

As described above, when the frame F is clamped by the two clamp pins 150a and 150b at each of the four places from the thickness direction of the rim, it is important that the rim of the frame F is reliably held between the two clamp pins 150a and 150b at each place. For this reason, the operator confirms whether or not the rim of the frame F enters between the two clamp pins 150a and 150b at each place.

At this time, in FIGS. 2 and 3, a space Wf is ensured between a left side surface 102Rb on the front end side of the lower right slider 102R at the near side of the apparatus 1 (apparatus 21) and a right side surface 102Lb on the front end side of the lower right slider 102L. The interval between the clamp pins 150 in the lower right slider 102R and the clamp pins 150 in the lower left slider 102L is set to a distance so as to hold a frame in which a distance between a right end of a right rim and a left end of a left rim is relatively narrow. To ensure the space Wf as wide as possible, the left side surface 102Rb and the right side surface 102Lb are disposed near the clamp pins 150 in a state where the opening/closing mechanism 160 of the clamp pins 150 enters inside. In this embodiment, the space Wf of approximately 50 mm is ensured.

The height of each of a cover top surface 102Rc (a top surface at a front end portion of the lower right slider 102R) serving as a root portion of the clamp pin 150 and a cover top surface 102Lc (a top surface at a front end portion of the lower left slider 102L) is made as lower as possible with respect to the height (the position in the Z direction) when the clamp pins 150a is most opened. The cover top surfaces 102Rc and 102Lc are near the clamp pins 150a. The cover top surface 102Rc on the front end side of the lower right slider 102R is formed to be lower than the height of a main body cover top surface 102Rd on the rear end side of the lower right slider 102R (the rotation shaft 104R side). Similarly, the cover top surface 102Lc on the front end surface of the lower left slider 102L is formed to be lower than the main body cover top surface 102Ld on the rear end side of the lower left slider 102L (the rotation shaft 104L side).

As such, if the space Wf is formed, and the cover top surfaces 102Rc and 102LC on the front end side are formed low, visibility when the rim is clamped by a pair of clamp pins 150 is improved.

The covers formed in the upper right slider 103R and the upper left slider 103L on the depth side of the apparatus also have the same configuration as the sliders 102R and 102L. However, there is no case that the operator comes in sight over the sliders in a state where the rim is clamped by the clamp pins 150 of the sliders 103R and 103L on the depth side, the same configuration is not necessarily used.

As shown in FIG. 1A, the mounting portion 300 for mounting the lens holder 310 is arranged on the depth side of the apparatus (a rear side further than the sliders 103R and 103L on the depth side, and a substantially central portion in the horizontal direction). Since the mounting portion 300 is disposed on the near side, visibility of the clamping state of the rim by the clamp pins 150 of the sliders 102R and 102L is further improved.

In view of improvement in visibility of the clamping state of the rim, opening/closing of the upper slider 103 and the lower slider 102 may be performed by the direct-acting mechanism. In the above description, the sliders 102R, 102L, 103R, and 103L are separated, and the space Wf is formed between the opposing side surfaces of the sliders 102R and 102L on the near side. Alternatively, portions on the holding portion base 101 side of the sliders 102R and 102L may be connected by a coupling member with each other as a single body. In this case, the height of the connection portion of the sliders 102R and 102L is preferably lower than that a contact surface of the clamp pin 150b on the side of the lens front surface (may be lower than an area within which the clamp pin 150 is movable). In order words, the space Wf is preferably formed between the opposing side surfaces of the sliders 102R and 102L on the near side, specifically, between the side surfaces having a height or more when the clamp pins 150 are arranged.

Figure 11A:
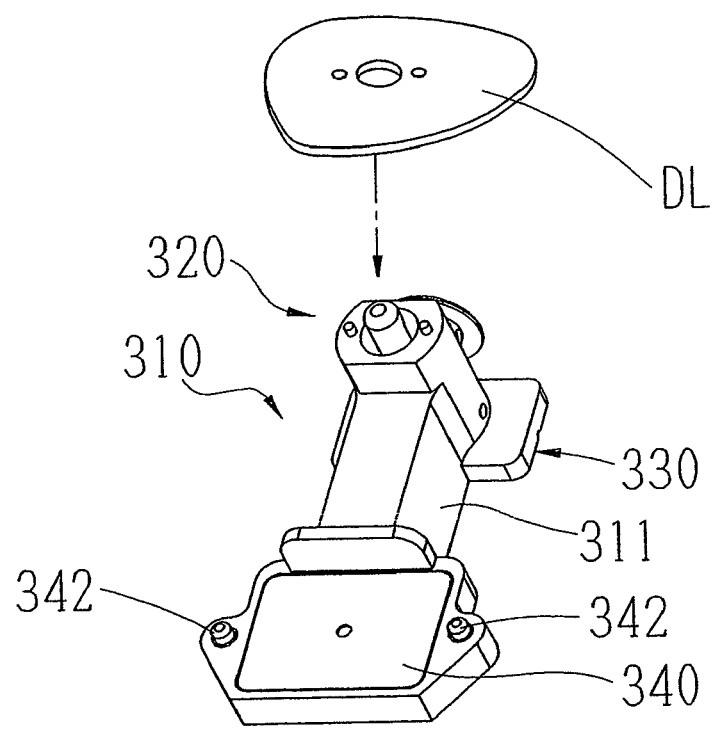
FIG. 11A is a diagram showing the configuration of a lens holder.
Figure 11B:
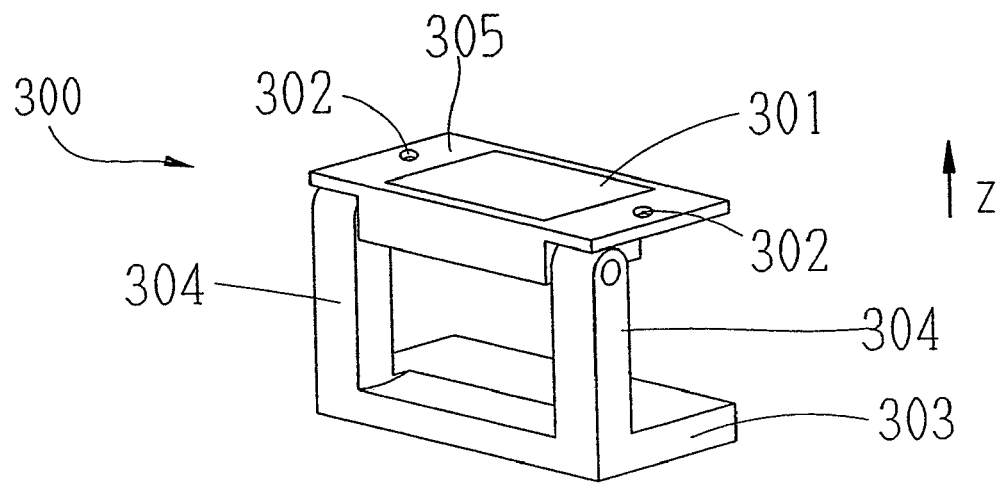
FIG. 11B is a diagram showing the configuration of a mounting portion of a lens holder.

Next, the configuration of the mounting portion 300 of the lens holder 310 will be described. FIGS. 11A and 11B are diagrams illustrating the configuration of the mounting portion 300. Specifically, FIG. 11A is a perspective view of the lens holder 310, and FIG. 11B is a perspective view of the mounting portion 300. The mounting portion 300 has a block 303 that is fixed at the upper portion of the apparatus at the rear of the frame holding mechanism 100, two supports 304 that extend from the block 303 toward the upper portion of the Z direction, and a plate 305 that is arranged to be rotatable around a horizontal shaft passing through the supports 304. Provided at an upper portion of the plate 305 are a magnet 301 for holding the lens holder 310 by a magnetic force and holes 302 for positioning the lens holder 310. The rotation range of the plate 305 is limited by regulating members provided in the supports 304 at a position in a horizontal state when being turned to the near side.

As the lens holder 310, a known lens holder described JP-A-2000-317795 (U.S. Pat. No. 6,325,700) may be used. The lens holder 310 has a template fixing portion 330 and a demo lens fixing portion 320 on a front end side of a main body block 311. A fitting portion 340 to be fitted to the plate 305 is provided at a rear end of the main body block 311. The template fixing portion 330 and the demo lens fixing portion 320 are reversely used. In the drawing, a demo lens DL is fixed to the demo lens fixing portion 320. Iron plates are fixed to the front and rear surfaces of the fitting portion 340. Two pins 342 which are individually inserted into the two holes 302 of the plate 305 are fixed to the front and rear surfaces of the fitting portion 340, respectively. If the pins 342 are individually inserted into the two holes 302, the lens holder 310 is positioned at a predetermined position of the plate 305 of the mounting portion 300, and the iron plates of the fitting portion 340 are attracted to the magnet 301. Thus, the lens holder 310 is fixed to the mounting portion 300. Since the plate 305 is rotatable in the Z direction (a direction perpendicular to the measurement reference plane), when measurement, the lens holder 310 is also rotated in a direction of an arrow HA in FIG. 1A. This rotation is limited by the regulating members such that the template fixing portion 330 or the demo lens fixing portion 320 is put in the horizontal state (parallel to the measurement reference plane). The template or demo lens attached to the lens holder 310 is disposed at a predetermined measurement position of the measurement mechanism 200. When the template and demo lens do not need to be measured, the plate 305 is rotated in a direction opposite to the arrow HA, and as shown in FIG. 1A, the lend holder 310 is disposed at a retracted position out of the frame holding mechanism 100. For this reason, while the lens holder 310 is set in the mounting portion 300, the frame F is held by the frame holding mechanism 100, and measurement can be then performed. Unlike the related art, it is not necessary to attach/detach the lens holder 310 to the mounting portion 300 each time. As a result, labor for attaching/detaching the lens holder 310 is reduced, and thus convenience is improved.

As described above, the space Wf is formed between the sliders 102L and 102R on the near side of the apparatus, the cover top surfaces 102Rc and 102Lc on the front end side are formed low. In addition, the mounting portion 300 is arranged on the depth side of the apparatus. Therefore, visibility of the clamping state of the rim by the clamp pins 150 of the sliders 102R and 102L is further improved. The lens holder may be configured to move in parallel with the measurement reference plane.

<Measurement Mechanism>

Figure 9:
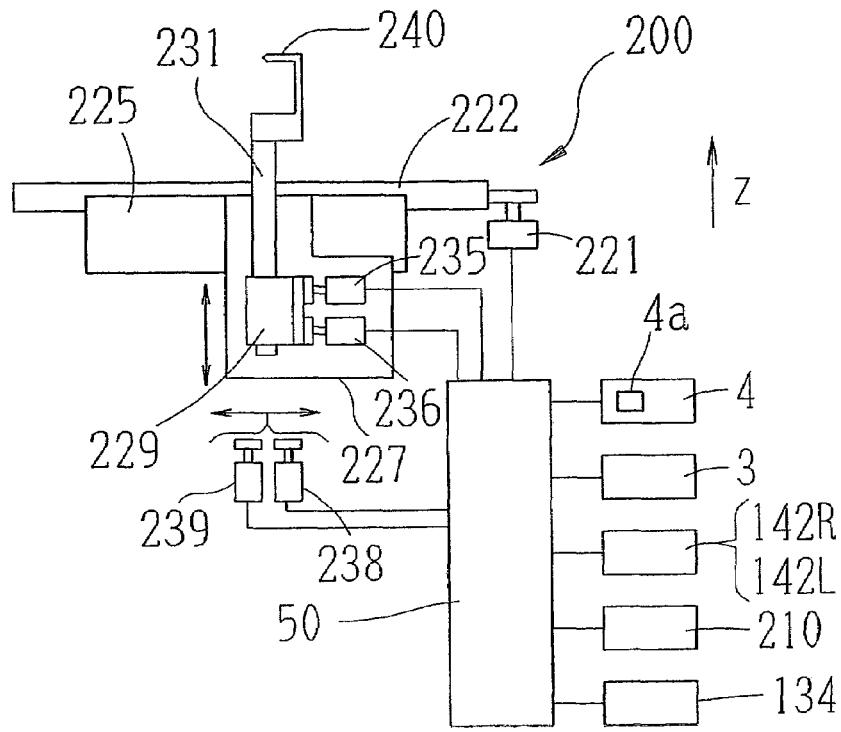
FIG. 9 is a diagram showing the schematic configuration of a measurement mechanism.

FIG. 9 is a diagram showing the schematic configuration of the measurement mechanism 200. The measurement mechanism 200 includes a rotation base 222 that is rotated in the horizontal direction by a pulse motor 221, a fixed probe 225 that is fixed to the rotation base 222, a transversely movable base 227 that is held by the fixed probe 225 so as to be transversely movable, a Z-axis movable base 229 that is held by the transversely movable base 227 so as to be movable in the Z direction, a tracing stylus shaft 231 that is provided in the Z-axis movable base 229 so as to be rotatable around a vertical axis (Z axis), a tracing stylus 240 that is attached to an upper end of the tracing stylus shaft 231, and whose front end is on the center of the tracing stylus shaft 231, a motor 235 that moves the Z-axis movable base 229 in the Z direction together with the tracing stylus shaft 231, an encoder 236 that detects the amount of movement of the Z-axis movable base 229, a motor 238 that transversely moves the transversely movable base 227, and an encoder 239 that detects the amount of movement of the transversely movable base 227. The motors and the encoders are connected to a control unit 50. A moving mechanism 210 is provided to move the measurement mechanism 200 in the horizontal direction (X direction), thereby measuring the left and right rims of the frame F. As the measurement mechanism 200, a known mechanism disclosed in JP-A-2000-314617 (U.S. Pat. No. 6,325,700) may be used, and thus a detailed description thereof will be omitted. Connected to the control circuit 50 are also the switch section 4, the panel section 3, the clamping motors 142R and 142L, and the photosensor 134.

Figure 10:
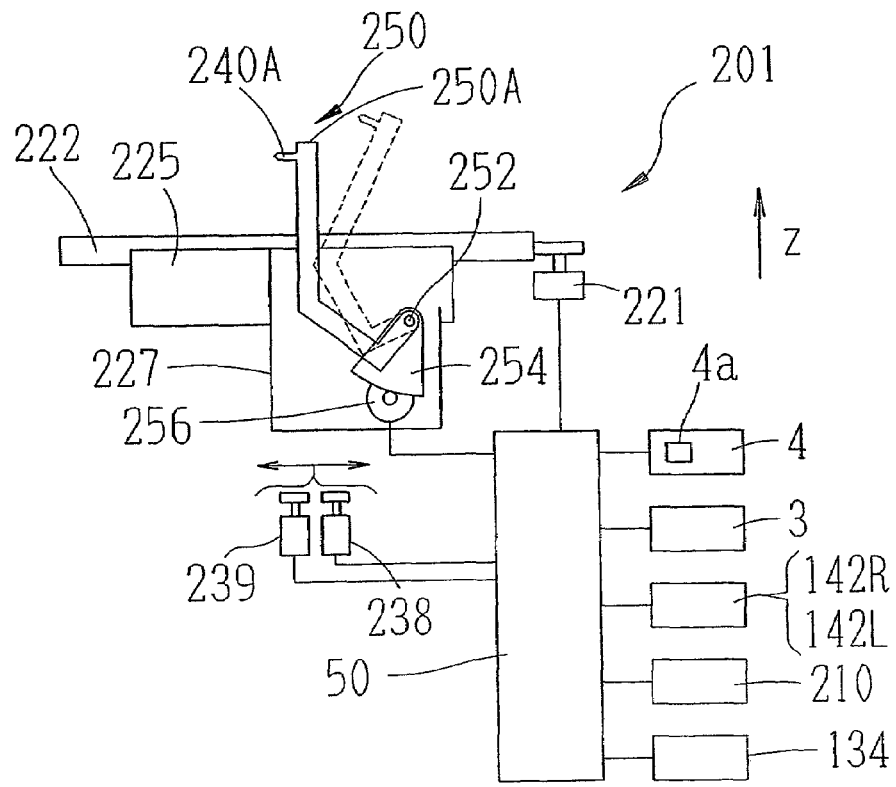
FIG. 10 is a diagram showing the schematic configuration of a modification of a measurement mechanism.

FIG. 10 shows a measurement mechanism 201 as an another example of the measurement mechanism 200, which is preferably used in measuring a rim of a high curved frame. In FIG. 10, the same parts as those in the measurement mechanism 200 of FIG. 9 are represented by the same reference numerals. The measurement mechanism 201 has a rotation base 222 that is rotated in the horizontal direction by a pulse motor 221, a fixed block 225 that is fixed to the rotation base 222, a transversely movable base 227 that is held by the fixed block 225 so as to be transversely movable, a motor 238 that moves the transversely moves the transversely movable base 227, an encoder 239 that detects the amount of movement of the transversely movable base 227, an arm 250 that is held so as to be rotatable in the Z direction around a fulcrum 252 provided on the transversely movable base 227 (to be inclined with respect to the vertical axis), a tracing stylus 240A that is attached to a front end side of the arm 250, an encoder 256 that detects rotation of the arm 250 around the fulcrum 252 through a gear 254, and a motor (not shown) that rotates the arm 250. The arm 250 is bent. In this example, the tracing stylus 240A which is inserted into the groove of the rim is needle-like and is attached to a base portion 250A at a front end of the arm 250.

Next, the operation of the apparatus having the above configuration will be described. If one of the four sliders 102R, 102L, 103R, and 103L is rotated in the open direction in accordance with an operator's operation, for example, if the lower left slider 102L is rotated in the open direction around the 104L, other sliders 102R, 103R, and 103L are also rotated in the open direction around their rotation shafts by the rotation transfer mechanism 1. In a state where the interval between the upper sliders 103R and 103L and the lower sliders 102R and 102L is opened, the operator positions the left and right rims of the frame F between the pair of clamp pins 150 of each of the sliders, and returns the sliders in the close direction. A centripetal force toward the reference line X01 is applied to the opposing sliders 102R and 103R and the opposing sliders 102L and 103L by the springs 130R and 130L, respectively. Thus, the interval between the sliders is narrowed, and the frame F is held around the reference line X01. At this time, as described above, the space Wf is formed between the sliders 102L and 102R on the near side of the apparatus, and the cover top surfaces 102Rc and 102Lc on the front end side becomes low. In addition, the mounting portion 300 is arranged on the depth side of the apparatus. Therefore, it is possible to easily confirm the clamping state of the rim by the clamp pins 150 of the sliders 102R and 102L on the near side. In particular, as shown in FIG. 1B, when the measurement apparatus 21 is arranged at the upper surface of the housing of the processing apparatus 20, an operator of short stature needs to confirm the clamping state from an obliquely upper portion on the near side of the apparatus. However, with the above configuration, it is possible for the operator to easily confirm the clamping state.

After the left and right rims of the frame F are set between the clamp pins 150, if the tracing switch 4a of the switch section 4 is pressed, a switch signal is input as a clamping start signal, and the control unit 50 simultaneously drives the clamping motors 142L and 142R. Therefore, a pair of clamp pins 150 at each of the four places are simultaneously closed, and the left and right rims of the frame F is held on the measurement reference plane.

Subsequently, the control unit 50 operates the measurement mechanism 200. First, the right rim is measured. The control unit 50 drives the motors 235 and 238 of the measurement mechanism 200, moves the tip of the tracing stylus 240 onto the measurement reference plane S01, and inserts the tracing stylus 240 into between the rims held by the frame holding mechanism 100. When measurement starts, a position where the tracing stylus 240 is inserted into the groove of the rim, for example, becomes the clamping position by the clamp pins 150 at the front end of the lower right slider 102R. Next, the control unit 50 rotates the pulse motor 221 every prescribed number of unit rotation pulses. The rotation base 222 is rotated by the pulse motor 221, and the transversely movable base 227 is transversely moved together with the tracing stylus 240 along a radius vector of the rim. This movement is detected by the encoder 239. The Z-axis movable base 229 is also moved in the Z direction together with the tracing stylus 240 in accordance with the warp of the rim, and this movement is detected by the encoder 236. The three-dimensional shape of the rim (target lens shape) is calculated as $(rn, \theta n, zn)$ (where $n=1, 2, \ldots$ and N) from the rotation angle (radius vector angle) $\theta$ of the rotation base 222 by the pulse motor 221, the radius vector length r detected by the encoder 239, and the amount z of movement in the Z direction detected by the encoder 236.

If measurement of the right rim is completed, the tracing stylus 240 is removed from the rim. The measurement mechanism 200 is moved to a measurement position of the left rim by the moving mechanism 210, and the shape of the left rim is measured by the same operation. The control unit 50 measures the left and right rims to obtain a geometric center-to-center distance FPD of the left and right rims.

In measuring the target lens shape of the template or the demo lens by using the lens holder 310, a measurement pin to be in contact with the edges of the left and right rims is assembled with the transversely movable base 227. A measurement operation by the measurement pin is basically the same as the measurement by the tracing stylus. If the rotation base 222 is rotated while the measurement pin is in contact with the edge of the template or the demo lens, the target lens shape is obtained on the basis of the rotation angle (radius vector angle) $\theta$ of the rotation base 222 and the radius vector length r detected by the encoder 239.

In measuring the rim by using the measurement mechanism 201 shown in FIG. 10, a tip of a tracing stylus 240A is inserted into the groove of the rim disposed on the measurement reference plane S01. The transversely movable base 227 is transversely moved by the rotation base 222 together with the tracing stylus 240A along a radius vector of the rim, and this movement is detected by the encoder 239. In addition, as indicated by a dotted line in FIG. 10, the arm 250 is rotated around the fulcrum 252 together with the tracing stylus 240A in accordance with the warp of the rim, and this rotation angle is detected by the encoder 256. The position of the rim in the Z direction is calculated from the rotation angle of the arm 250 and the movement position of the transversely movable base 227, and the three-dimensional shape of the rim (target lens shape) is measured as $(rn, (n, zn))$ (where $n=1, 2, \ldots$ and N) on the basis of the rotation angle (radius vector angle) (of the rotation base 222 and the radius vector length r detected by the encoder 239. In respects to the calculation of the three-dimensional shape, for example, measurement technology disclosed in JP-A-2001-174252 may be used.

According to the frame holding mechanism 100, in the sliders 102R, 102L, 103R, and 103L of this apparatus, the contact portions 180 of the protrusion cover 182 are formed such that the edge of the rim is in contact with only the vicinity of the clamp pins 150, and the cover surfaces 102Ra, 102La, 103Ra, and 103La are formed to be spaced by the distance LC such that the rim is not in contact therewith. Therefore, it is possible to stably hold the frame F while the length of the clamp pin 150 becomes short, and to narrow the measurable vertical width FW of the rim.

Figure 12A:
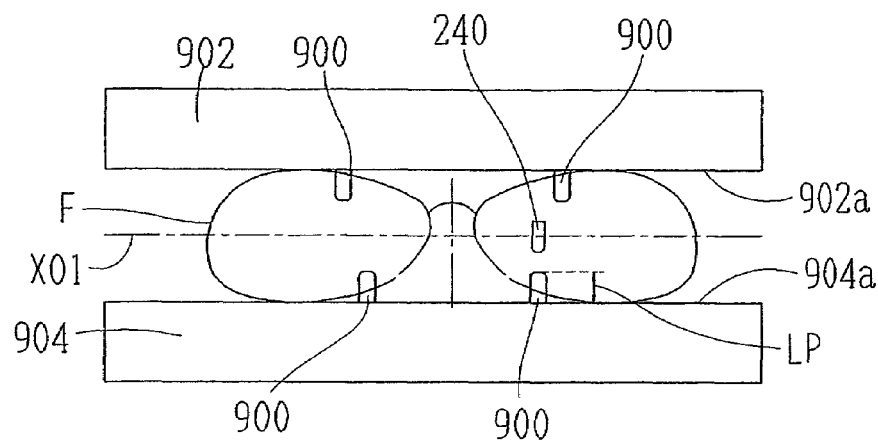
FIGS. 12A, 12B, and 12C are diagrams illustrating holding of an eyeglass frame by a frame holding mechanism.

FIG. 12A is a diagram showing sliders in a known frame holding mechanism. In the known frame holding mechanism, to hold the frame F on the measurement reference plane, a pair of openable/closable clamp pins 900 are provided to protrude from the upper slider 902 and the lower slider 904 to be opened/closed opposite to each other. To be in contact with the edge of the rim, opposing surfaces 902a and 904a of the upper slider 902 and the lower slider 904 have a planar shape over a wide range. That is, in the known frame holding mechanism, the top end of the rim is in contact with the opposing surface 902a of the upper slider 902, and the bottom end of the rim is in contact with the opposing surface 904a of the lower slider 904. Thus, the frame F is held. The opposing surfaces 902a and 904a of the upper slider and the lower slider have a planar shape over a wide range so as to be in contact with the edges of rims having various shapes. In addition, in order to clamp the rims having various shapes, in particular, to hole a rim having large vertical width on the ear side with respect to the position of the clamp pin 900, it is necessary to make the length LP of the clamp pin 900 (the length protruding from a pair of opposing surfaces of the sliders) long (for example, 7 mm or more).

Figure 12B:
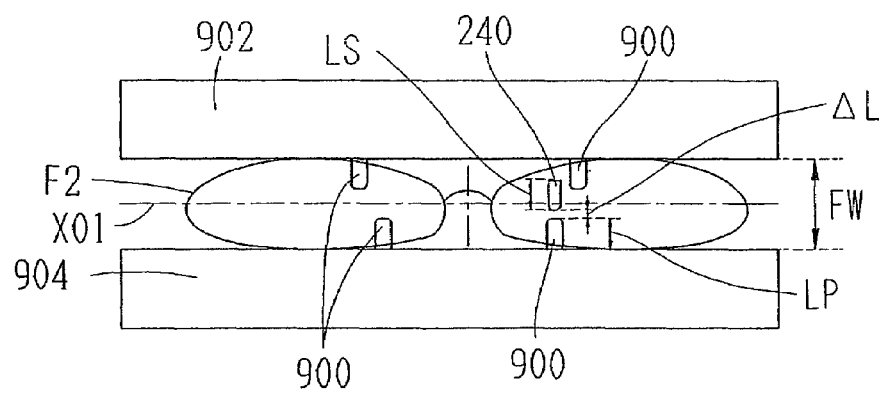

However, if the length LP becomes long, it is impossible to narrow the measurable vertical width FW of the rim. That is, when measurement starts, as shown in FIG. 12B, a position where the tracing stylus 240 is inserted into the groove of the rim becomes the hold position of the clamp pin 900 disposed on the measurement reference plane. To conduct measurement while interference of the tracing stylus 240 and the clamp pins 900 is avoided, the measurable vertical width FW of the rim is limited to a length obtained by adding a marginal length ΔL to a total length of the length LP and the length LS of the tip of the tracing stylus 240. For example, when LP is 7 mm and LS is 8 mm, and ΔL is 3 mm, the measurable vertical width FW of the rim becomes 18 mm. Recently, the vertical width of the rim is narrower than the above value, and it is impossible to cope with measurement of the narrower vertical length.

Figure 12C:
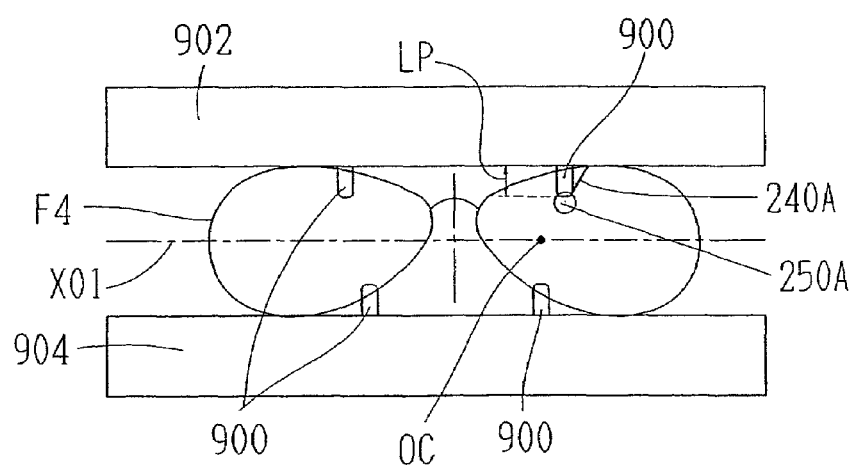

As shown in FIG. 12C, if the length LP of the clamp pin is long, in case of a measurement mechanism that inserts a tracing stylus 240A obliquely with respect to an extension direction of the clamp pin 900, the base portion 250A of the tracing stylus 240A interferes with the clamp pins 900. This interference rarely occurs in the measurement mechanism in which the tracing stylus shaft 231 having the tracing stylus 240 is provided so as to be rotatable around the vertical axis (Z axis), as shown in FIG. 9. However, like the measurement mechanism 201 (or one disclosed in JP-A-2001-174252), in the measurement mechanism in which the arm 250 having the tracing stylus 240A attached its front end is inclined with respect to the vertical direction (a direction perpendicular to the measurement reference plane) in order to measure the shape of a rim of a high curved frame F4, the extension direction of the tracing stylus 240A is disposed on a meridian direction of the rotation center OC (the rotation center of the rotation base 222). Thus, no inference occurs.

Figure 13A:
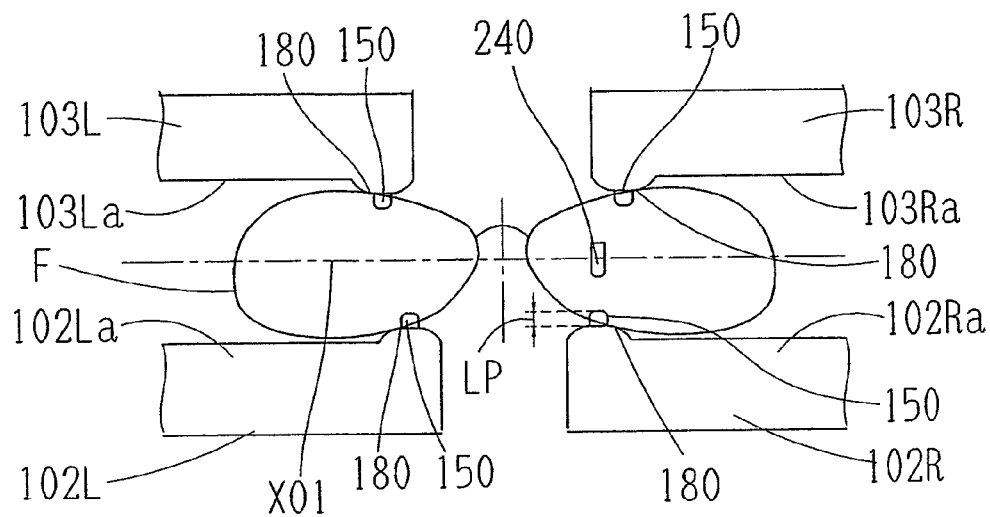
FIGS. 13A, 13B, and 13C are diagram illustrating holding of an eyeglass frame by a frame holding mechanism according to an embodiment of the invention.
Figure 13B:
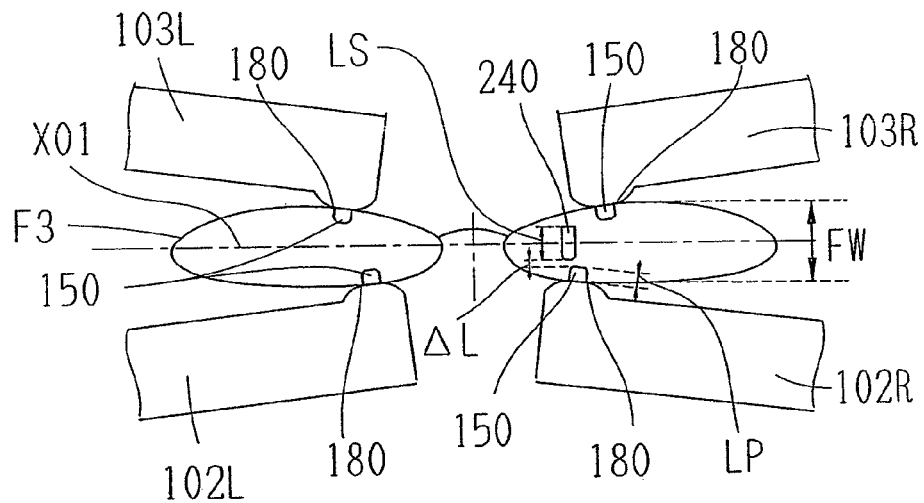

In contrast, in the sliders 102R, 102L, 103R, and 103L of this apparatus, the contact portions 180 of the protrusion cover 182 is formed such that the edge of the rim is in contact with only the vicinity of the clamp pins 150, and the cover surfaces 102Ra, 102La, 103Ra, and 103La are formed to be spaced by the distance LC such that the rim is not in contact therewith. For this reason, as shown in FIG. 13A, even if the length of each clamp pin 150 becomes short, as compared with the related art, it is possible to stably hold a rim having a large vertical width on the ear side with respect to the positions of the clamp pins 150. In addition, since the length LP can be reduced, as compared with the related art, as shown in FIG. 13B, it is possible to narrow the measurable vertical width FW of the rim. At this time, a frame F3 has a narrower vertical width than that of a frame F2. For example, when LP is 3 mm, LS is 8 mm, and ΔL is 3 mm, the measurable vertical width FW of the rim becomes 14 mm, and thus as the length LP becomes shorter, as compared with the related art, it is possible to measure a rim having a narrower vertical width FW so much.

Figure 13C:
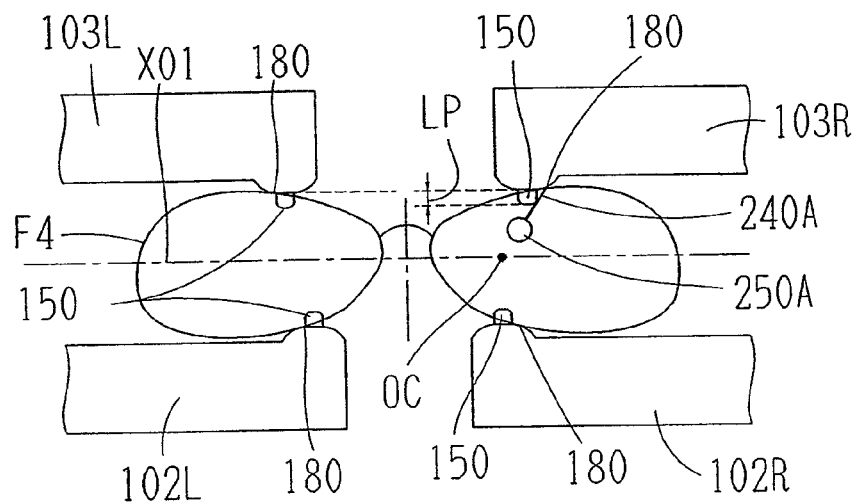

If the length LP is reduced, as shown in FIG. 13C, even at a measurement place where the tracing stylus 240A obliquely enters with respect to the extension direction of the clamp pins 150, it is possible to suppress interference of the tracing stylus 240A or the base portion 250A and the clamp pins 150. For this reason, it is possible to easily measure a high curved frame by using the measurement mechanism 200 shown in FIG. 9 or the measurement mechanism disclosed in JP-A-2001-174252.

What is claimed is:

1. An eyeglass frame measurement apparatus comprising:
   a measurement unit which includes a tracing stylus to be inserted into a groove of a rim of an eyeglass frame, a moving mechanism for moving the tracing stylus along the groove of the rim, and a detector for detecting movement of the tracing stylus, and obtains three-dimensional data of the groove of the rim based on a detected result by the detector; and
   a holding unit which includes upper and lower sliders for positioning the frame with left and right clamp pins for clamping the rim, and holds the frame fixedly,
   wherein each of the upper and lower sliders is formed with a protruding portion which is disposed on at least one of left and right sides of each of the clamp pins and protrudes toward a reference line lying between the sliders, and each of the sliders is prevented from moving toward the reference line by bringing the rim into contact with the protruding portion.

2. The apparatus according to claim 1, wherein each of the protruding portions is formed at an area within which each of the clamp pins is movable.

3. The apparatus according to claim 1, wherein each of the protruding portions is formed to surround each of the clamp pins.

4. The apparatus according to claim 1, wherein each of the protruding portions is formed at an outer side of each of the clamp pins.

5. The apparatus according to claim 1, wherein each of the protruding portions is formed at outer and inner sides of each of the clamp pins, and the outer side protruding portion protrudes further than the inner side protruding portion.

6. The apparatus according to claim 1, wherein the reference line is a central line between the sliders.

* * * * *